Figures 1, 2:
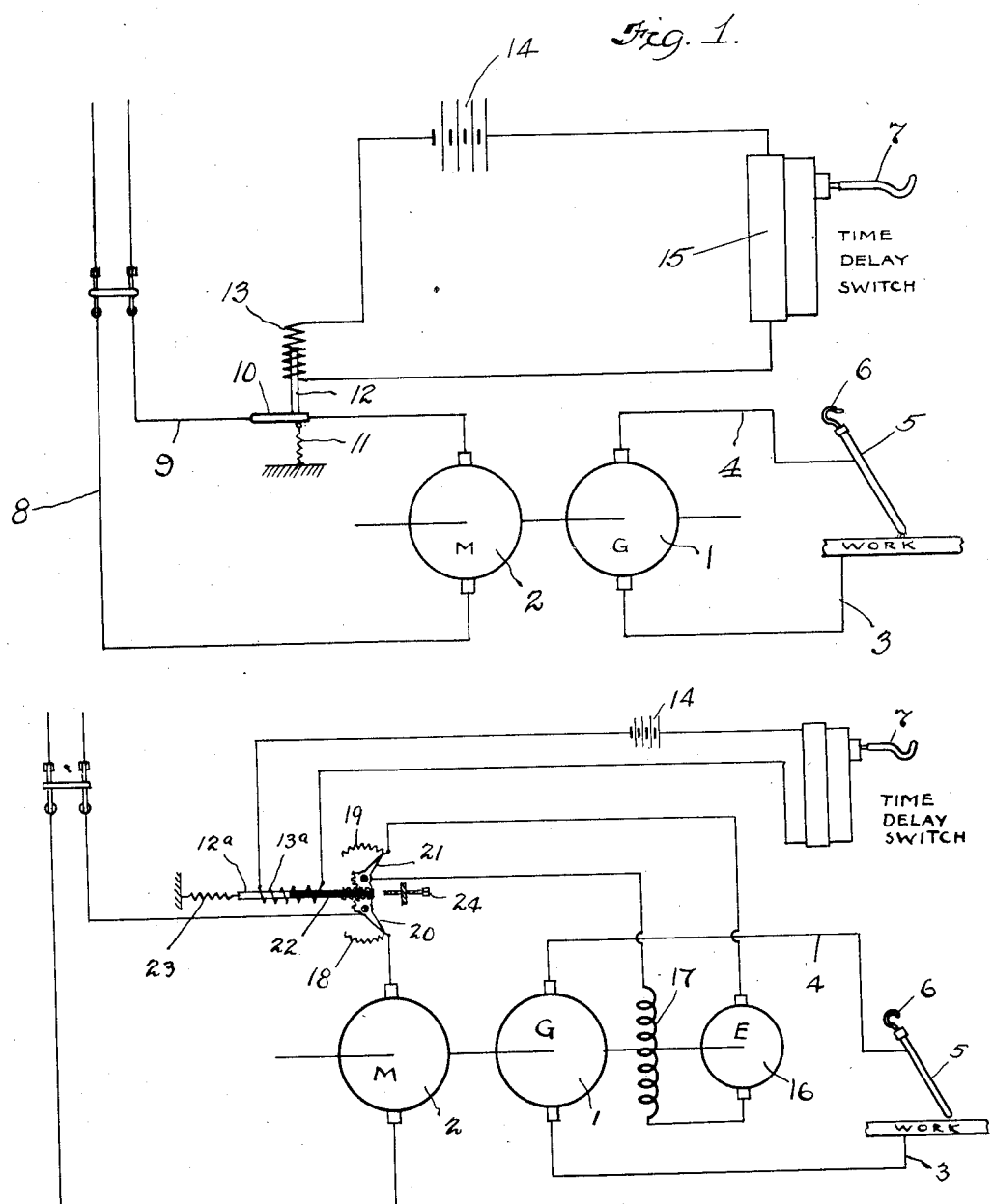

March 27, 1934.    G. G. LANDIS    1,952,505

WELDING APPARATUS CONTROL

Filed May 17, 1932

INVENTOR.
George G. Landis
BY
Fay, Oberlin & Fay
ATTORNEYS.

Patented Mar. 27, 1934

1,952,505

UNITED STATES PATENT OFFICE 1,952,505

WELDING APPARATUS CONTROL

George G. Landis, Cleveland, Ohio, assignor to The Lincoln Electric Company, Cleveland, Ohio, a corporation of Ohio Application May 17, 1932, Serial No. 611,805

8 Claims. (Cl. 219—8)

This invention relates, as indicated, to welding apparatus control and has more particular reference to the control of the welding current generating plant so that the operation thereof may very closely correspond to the requirements of the welding arc.

As is well known, the plant for generating the welding current usually comprises a generator which is driven by some motive power, such as an electric motor, or an internal combustion engine where no electric power for driving the plant is available. In order to conserve the energy which would be normally dissipated by internal resistance in the apparatus when running idle, and also to reduce the wear on such apparatus, the generating plant for the welding current should be running only during the time during which the welding operation is in actual progress, i. e., during the time while the arc is maintained.

To immediately shut down the welding current generating plant each time the welding arc is ruptured is usually impractical and undesirable for a number of reasons. In a number of instances, the welding arc is temporarily ruptured simply to enable the operator to make minor adjustments in the work or to replace or adjust the welding pencil. During such short periods it is desirable that the generating plant continue to operate at substantially full speed. If, however, the period of interruption is long enough so that an operator would ordinarily lay aside the electrode holder, at least for the time being, the generating plant can be stopped or at least reduced to idling speed to be again brought up to operating speed when the welding operation is to resume.

It is among the objects of this invention to provide a control system for welding current generating apparatus which shall function in the above indicated desirable manner.

To the accomplishment of the foregoing and related ends, said invention, then, consists of the means hereinafter fully described and particularly pointed out in the claims; the annexed drawing and the following description setting forth in detail certain means of carrying out the invention, such disclosed means illustrating, however, but one of various ways in which the principle of the invention may be used.

In said annexed drawing:—

Fig. 1 is a diagrammatic representation of the several elements of the welding current generating plant showing in association therewith one form of the control system comprising this invention, and Fig. 2 is a diagrammatic representation of a control system modification of that illustrated in Fig. 1.

Referring now more specifically to the drawing, the welding current generating plant comprises a generator 1 of the usual type, which is driven by some power means such as an electric motor 2. As hereinafter more fully explained, the principles comprising this invention are equally applicable to a generating plant in which the motive power is furnished by any well-known means, such as an internal combustion engine and the like.

The welding current generator 1 has leads 3 and 4 associated therewith which are respectively connected to the work and a welding electrode generally indicated at 5 adapted to be presented in arcing relation to the work. Of course, a suitable holder will be provided for supporting and manipulating the electrode 5 and it is immaterial, so far as concerns the present invention, whether such electrode be of fusible or non-fusible type. The electrode holder, regardless of its particular form, will be adapted, either by the employment of a hook 6 or similar means, to be hung on a support 7 by the operator when the welding operation is to be interrupted for any appreciable period.

The motor 2 which drives the generator has leads 8 and 9 associated therewith which connect such motor to the incoming power line. The representation of the field and armature windings of both machines has been omitted for the reason that it is unnecessary to include a showing of the same to the full understanding of this invention.

The power circuit for the motor 2 contains a switch, generally indicated at 10, which, when such switch is opened or closed, will de-energize or energize the motor. The switch 10 is normally maintained in its closed position by some means such as a spring 11 and is adapted to be opened by the energization of a solenoid, the armature 12 of which is diagrammatically illustrated in the drawing as connected to the switch 10.

The winding 13 of the switch-operating solenoid is in series with a suitable source of supply, such as a battery 14, and also in series with a time-delay switch, generally indicated at 15. The time-delay switch at 15 may be of any well-known type, such as a dashpot, a mercury switch, etc. Such time-delay switch is, however, actuated by the lever 7 on which the electrode holder is hung by the operator. The arrangement of the parts is such that when the electrode holder is not hung on the hook 7 the time-delay switch 15 maintains the circuit, including the solenoid 13, open so that the spring 11 may close the switch 10 and complete the power circuit to the motor 2. The time-delay switch 15 will also preferably be adjustable in its nature so that the period from the time the electrode holder is hung on the hook 7 to the time when such switch closes the circuit of the solenoid coil 13 may be varied to suit particular operating conditions.

The operation of the above described control system is briefly as follows: The hook 7 will be so positioned that the operator will hang the electrode holder thereon during all normal interruptions of the welding operation. This will trip the time-delay switch 15. If the electrode holder was hung on the hook 7 simply to effect a minor adjustment either of the electrode or the work, and is taken down from the hook within a relatively short time, the switch 15 will not have had an opportunity to close the circuit of the solenoid coil 13 and hence, the motor 2 continues to operate at full speed. Should the holder be allowed to remain on the hook 7 for a time greater than the predetermined setting of the switch 15, the circuit of the solenoid coil 13 will eventually be closed and the armature 12 drawn upwardly, opening the switch 10, thereby permitting the driving motor to come to rest. As soon as the electrode holder is removed from the hook 7 the solenoid coil 13 is de-energized, permitting the spring 11 to close the switch 10, whereupon the motor 2 is immediately energized and the generator 1 brought up to the proper speed preparatory to the establishment of the arc between the electrode and the work.

The system illustrated in and described in connection with Fig. 1, it will be noted, stops the welding current generating mechanism at the end of a predetermined time interval after the electrode is hung onto its supporting hook. Instead of stopping the welding current system completely each time the electrode remains on the hook for a predetermined length of time it may be desirable to simply reduce the speed of operation of such apparatus or otherwise vary its operating characteristics so that the energy consumption of the apparatus while running idle is reduced to a minimum. One manner in which the idling operating characteristics of the apparatus may be varied so as to conserve energy during the idling period is illustrated in Fig. 2 in which the generator and motor respectively 1 and 2 have associated therewith an exciter 16 which is driven from the motor either directly or indirectly and which supplies the current to the exciting winding 17 of the generator. In the system illustrated in Fig. 2 instead of opening the supply line to the motor 2 and thereby stopping the apparatus I propose to reduce the apparatus to idling speed and otherwise reduce the current consumption when idling at the expiration of a predetermined time interval after the electrode is placed on the hook 7.

The specific apparatus chosen for purposes of illustration, shown in Fig. 2, for accomplishing this result comprises variable resistances 18 and 19 in the circuit of the motor and exciter. The value of these resistances in series in their respective circuits may be varied by means of contact members 20 and 21 adapted to be simultaneously actuated by the movement of some such means as a rack 22 associated with the armature 12a of the solenoid winding 13a. The armature is normally maintained in the position illustrated in Fig. 2 by means of a spring 23 and is forced to the right against the influence of such spring when the coil 13a is energized. The travel of the armature 12a to the right, and accordingly the arcuate movement of the contact arms 20 and 21 may be controlled by an adjustable stop 24 which may be in the form of a threaded screw carried in a suitable support and adapted to engage the end of the rack 22.

When the form of control system such as is illustrated in Fig. 2 is employed, the placing of the electrode on the hook 7 for a time interval such as to permit the time-delay switch to close the circuit including the solenoid coil 13a and thereby energizing such solenoid moves the rack 22 to the right inserting the resistances 18 and 19 in series with the motor 2 and the exciter winding 17 of the generator 1. The motor is accordingly slowed down, the exciter field of the generator reduced to a minimum and hence the power consumption reduced to a very minimum without actually bringing such apparatus to rest.

It should be noted that it is within the contemplation of my invention to provide means for individually actuating the contact members 20 and 21 and apparatus materially different from that shown in the drawing for purposes of illustration may be employed to accomplish the hereinbefore set forth results.

As above indicated, it is within the contemplation of this invention to employ any other suitable means, such as an internal combustion engine, for driving the generator 1, and when such means is employed the solenoid armature 12 will be connected to the throttle lever for such engine so that the control effected by the system comprising this invention will be substantially as above described.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In electric arc welding apparatus, the combination of a welding current generator, driving means for such generator, means for supporting the welding electrode holder when the same is not in use, and means for varying the operating characteristics of said driving means at the expiration of a predetermined time interval after such welding electrode holder is placed on said supporting means.

2. The combination with electric arc-welding apparatus including a generator and an electric motor for driving the same, an external resistance adapted for connection in series with the power line to said motor, means including a time delay switch effective at the expiration of a predetermined time interval after actuation, for so connecting said resistance in series with said motor, and means for supporting the electrode when not in use adapted when the electrode is placed thereon to actuate said time delay switch.

3. The combination with electric arc-welding apparatus including a welding current generator and exciter means for such generator, of means including a time delay switch effective at the expiration of a predetermined time interval after actuation to reduce the excitation of said generator, and means for supporting the electrode when not in use adapted when the electrode is placed thereon to actuate said time delay switch.

4. The combination with electric arc-welding apparatus including a welding current generator, driving means for such generator and exciter means for such generator, of means including a time delay switch effective at the expiration of a predetermined time interval after actuation to reduce the speed of said driving means and to reduce the excitation of said generator, and means for supporting the electrode when not in use adapted when the electrode is placed thereon to actuate said time delay switch.

5. The combination with electric arc welding apparatus including a welding current generator, of control means including a time delay switch under control of the operator at the welding station and controlling a circuit independent of the welding circuit effective at the expiration of a predetermined time interval after actuation to vary the operating characteristics of the generator.

6. The combination with electric arc welding apparatus including a welding current generator and driving means for such generator, of control means including a time delay switch under control of the operator at the welding station and controlling a circuit independent of the welding circuit, effective at the expiration of a predetermined time interval after actuation to vary the operating characteristics of said driving means.

7. The combination with electric arc welding apparatus including a welding current generator, of control means including a time delay switch adapted for actuation by a motion of the operator other than a breaking of the arc, said control means effective at the expiration of a predetermined time interval after actuation of said switch to vary the operating characteristics of said generator.

8. The combination with electric arc welding apparatus including a welding current generator and driving means therefor, of control means including a time delay switch adapted for actuation by a motion of the operator other than a breaking of the arc, said control means effective at the expiration of a predetermined time interval after actuation of said switch to vary the operating characteristics of said driving means.

GEORGE G. LANDIS.